United States Patent [19]
Pickert

[11] 3,730,597
[45] May 1, 1973

[54] VARIABLE LOAD BRAKE CONTROL APPARATUS

[75] Inventor: Lynn I. Pickert, Watertown, N.Y.

[73] Assignee: General Signal Corporation, Rochester, N.Y.

[22] Filed: July 16, 1971

[21] Appl. No.: 163,229

[52] U.S. Cl. ............................................303/22 A
[51] Int. Cl. ...............................................B60t 8/18
[58] Field of Search.....................188/195; 303/22 A, 303/22 R, 6 C

[56] References Cited

UNITED STATES PATENTS

| 3,504,698 | 4/1970 | Frill | 303/22 A |
| 3,639,010 | 2/1972 | Mayer et al | 303/22 A |
| 3,547,499 | 12/1970 | Maskery | 303/22 R |
| 3,413,042 | 11/1968 | Herold | 303/22 A |
| 3,125,379 | 3/1964 | Valentine | 303/22 A |

Primary Examiner—Duane A. Reger
Attorney—Harold S. Wynn and Robert S. Seitter

[57] ABSTRACT

Variable load fluid brake control apparatus is provided for an air spring vehicle having a supply valve for controlling air pressure to the brakes, a control piston for controlling operation of the supply valve, and a compensating piston biased by opposing springs and fluid pressure related to the air spring for acting upon the control piston for governing operation of the supply valve.

7 Claims, 2 Drawing Figures

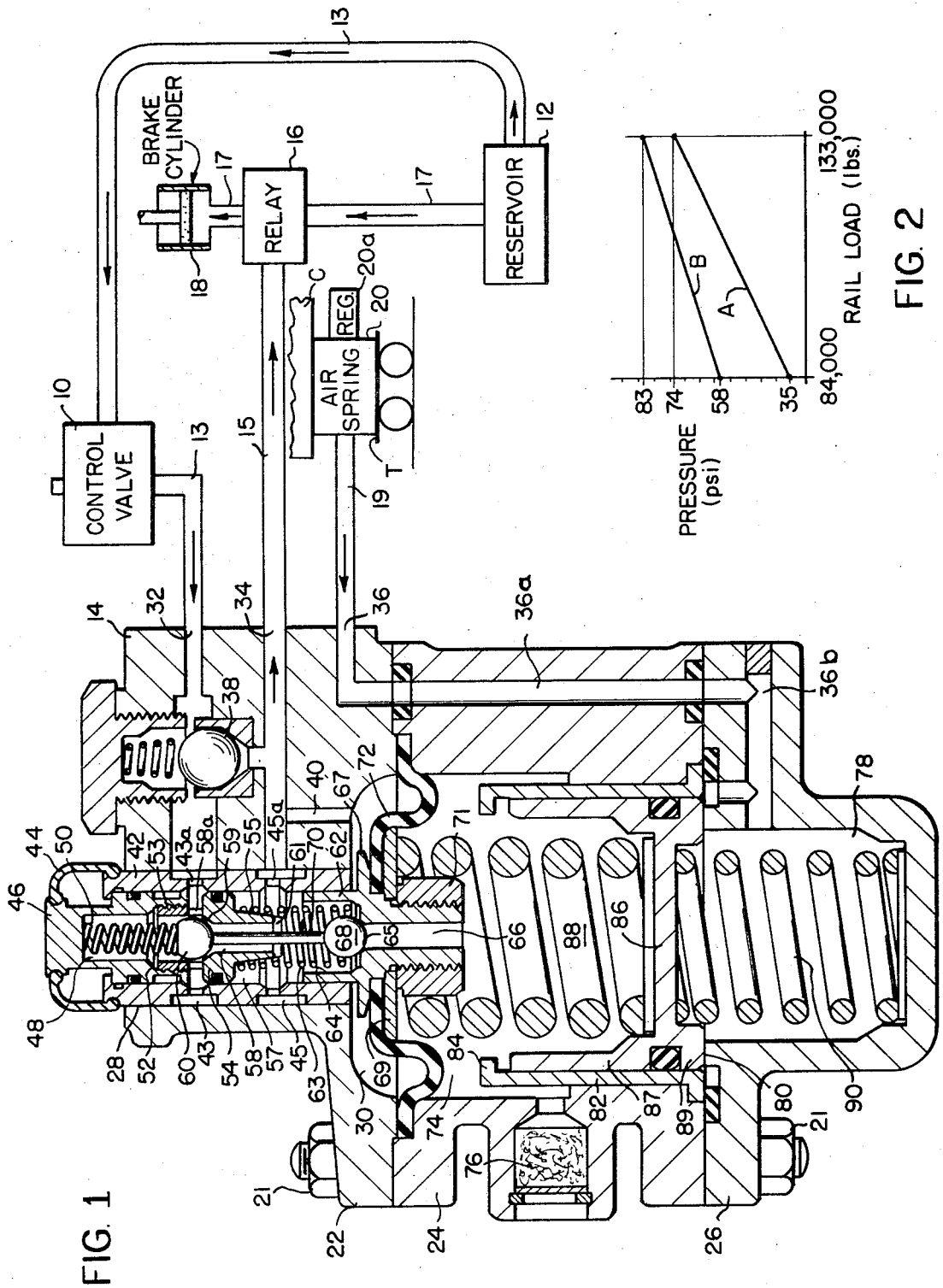

VARIABLE LOAD BRAKE CONTROL APPARATUS

During a full brake application, that is, either a full service or an emergency application, on a railroad car or a similar type vehicle, a predetermined braking force is applied to the wheels of the car to bring it to a stop as quickly and as safely as possible in an allotted period of time depending on the type of full brake application being made. It is important, however, that the braking force not be excessive since this could cause the wheels to slide on the tracks. Such sliding, in turn, can result in the formation of flat spots on the wheels which necessitates their costly replacement with new wheels. It should be clear that the braking force required during a full brake application is directly dependent on the rail load, that is, the total weight of the car including its load which is that load transmitted to the tracks. Since the rail load varies with the load carried by the car, the braking force required during a full brake application also varies.

Now, it should be clear that the full braking force required for a full car could cause the wheels of an empty car to slide and, conversely, the full braking force required for an empty car would be insufficient to quickly and safely stop a full car. Accordingly, it has become usual to provide variable load brake systems on railroad cars that vary the full braking force in accordance with changes in the load carried on the car. While such systems have been generally satisfactory when used with freight cars, they have not been entirely satisfactory when used with passenger cars. For example, freight trains generally comprise as much as 150 cars, while passenger trains, particularly rapid transit passenger trains, consist of only a few cars. Thus, failure of a variable load brake system in a passenger car has a more serious effect on the stopping of a train than does failure of such a braking system in a freight car.

The possibility of variable load brake systems failing is increased somewhat in new rapid transit cars which generally include an air spring mechanism between the car body and its trucks to maintain the height of the car body a fixed distance above the trucks and, therefore, the track regardless of the load on the car by varying the pressure in the air spring mechanism in accordance with the change in the load carried on the car body. The pressure in the air spring mechanism is used to pilot a variable control valve which limits the full brake application pressure applied to a brake cylinder and therefore, the braking force applied to the wheels by brake shoes actuated by the brake cylinder. Thus, it can be seen that variable load brake systems piloted by air spring mechanism are subject to failure if either the brake system or the air spring mechanism fails. For example, if the air spring mechanism ruptures and its pressure drops to zero, the variable control valve closes resulting in loss of brakes on the car. Also, if the air spring mechanism malfunctions such that too much pressure builds up, the variable control valve will remain open too long causing correspondingly too much pressure to build up in the brake cylinder. In this event, the wheels will slide on the track or the linkage operating the brake shoes can break resulting in a loss of brakes.

Another problem presented by newer rapid transit cars stems from the fact that they are of relatively lightweight construction, but carry relatively high loads. For example, in some cars now under construction, the car body which, as noted previously, is that portion of the car supported by the air spring mechanism is designed to carry a load approximately equal to its weight. Each car has two trucks which are not supported by the air spring mechanism and which have a total weight approximately equal to three-fourths (¾) of the weight of the car body. It can be seen, therefore, that variation in the load carried by a car are more significant with respect to the car body than with respect to the rail load. Accordingly, the pressure in the air spring mechanism varies more significantly than is required in the brake cylinder. If conventional variable load brake systems are used in these new cars, the pressure in the air spring mechanism would cause the brake cylinder pressure to provide too much braking force to the wheels of a fully loaded car. As noted previously, this could cause the wheels of the car to slide on the track.

An object of the present invention is to provide improved variable load fluid brake control apparatus to satisfy the requisites described above.

Other objects, purposes and characteristics of the present invention will be obvious from the accompanying drawings and pointed out as the description progresses.

SUMMARY OF THE INVENTION

Variable load fluid brake control apparatus is provided for an air spring vehicle developing a variable fluid pressure in accordance with variations in the vehicle load. A supply valve is provided for governing supply of fluid pressure to the brakes and a control piston is operable axially to control the supply valve. There is a control pressure chamber on one side of the control piston and load compensating chamber on the other side of the control piston. The compensating apparatus comprises a compensating piston in the compensating chamber axially spaced from the control piston by a first compression spring disposed between one side of the compensating piston and the control piston. A second compression spring is disposed between a fixed support and the other side of the compensating piston. Fluid in accordance with the air spring pressure is also applied to the other side of the compensating piston.

As noted previously, there is a spring bearing on one side of the piston and this spring is a compression spring having a predetermined spring constant. A second compression spring bears on the other side of the piston member and has a second spring constant. While the one spring resists movement of the piston due to an increase in air spring pressure, the second spring assists such movement. Since both springs are compression springs, it should be clear that during movement of the piston in the first direction the force exerted by the second spring decreases so that the force acting on the pilot chamber side of the piston does not build up at the same rate as the air spring pressure. By selecting the proper relationship between the spring constant of the one spring and the second spring, the pressure in the control chamber, and consequently the full brake application pressure in the brake cylinder, required to close the supply valve will vary with the load on the vehicle according to a different relationship than the pressure in the air spring required to maintain the height of the car body.

For a better understanding of the invention, reference may be made to the following description of a preferred embodiment of the invention, taken in conjunction with the figures of the accompanying drawing in which:

FIG. 1 is a schematic illustration of a variable load brake system in accordance with this invention with a variable load control valve shown in section; and, FIG. 2 is a graph showing air spring pressure and full brake pressure plotted against rail load.

Referring specifically to FIG. 1, there is disclosed a brake system in accordance with this invention for a single railroad car or similar type vehicle. The brake system comprises a control valve 10 of a conventional type which can be electrically or pneumatically operated from the cab of a train to selectively allow the flow of air from a reservoir 12, through a pipe 13, a variable load control valve 14, and pipe 15 to a generally conventional brake mechanism. For purposes of this disclosure the brake mechanism is shown as including a relay valve 16 located in a pipe 17 for controlling the flow of air from reservoir 12 to a brake cylinder 18. It should be understood, however, that relay valve 16 need not be utilized and that air can flow directly from variable load control valve 14 to brake cylinder 18 via pipe 15. The use of a relay valve is preferred, however, since it allows a small volume of air to control a relatively large volume of air. As is also conventional, brake cylinder 18 is connected to a suitable linkage (not shown) for moving the brake shoes (also not shown) against the wheels of the railroad car.

Variable load control valve 14 is regulated by an air spring mechanism which supports the car body C of the railroad car on its trucks T. The air spring mechanism generally includes an air spring 20 usually in the form of a flexible bag, located between the car body and the trucks. There is also provided a regulating valve mechanism 20a that is actuated in response to vertical movements of the car body caused by variations in the load on the car body to selectively increase or decrease the pressure in air spring 20. Thus, if the load on the car body increases, the car body moves downwardly toward the trucks and actuates regulating valve mechanism 20a to increase the pressure in air spring 20 which in turn raises the car body back to its original predetermined height above the trucks and, therefore, the tracks. Conversely, if the load on the car decreases, the car body rises with respect to the trucks and actuates regulating valve mechanism 20a to decrease the pressure in air spring 20 which in turn lowers the car back to its original predetermined height above the trucks and, therefore, the tracks. It should be noted that such air spring mechanisms are generally used in rapid transit type cars where for safety reasons it is desirable to keep the floor of the car level with the station platform.

From the preceding, it should be clear that the pressure in the air spring varies according to a fixed relationship with the load carried on the car body. As will be made clear hereinafter, the variable pressure in air spring 20 is communicated to variable load control valve valve 14 by a pipe 19 and regulates the output of the variable load control valve to vary the full braking force applied to the wheels of the car. If control valve 10 is electrically operated, pressure sensing transducers can be associated with air spring 20 to regulate full service braking pressure in accordance with the load on the car body. Accordingly, variable load control valve 14 will then be used to control emergency brake application pressure in accordance with the load on the car body. If control valve 10 is pneumatically operated, then variable load control valve 14 can be used to control full service brake pressure in accordance with the load on the car body.

Variable load control valve 14 comprises three housing sections 22, 24 and 26 clamped together by suitable fasteners 21 along adjacent mating surfaces. Housing section 22 includes an axial bore 28 extending from its free end to a counter bore 30 formed in the surface mating with housing section 24. Also provided in housing section 22 is an inlet passage 32 extending between bore 28 and pipe 13 from control valve 10, an output passage 34 axially spaced from the inlet passage and extending between bore 28 and pipe 15 to relay valve 16, and a control passage 36 that communicates with air spring 20 through pipe 19. A conventional spring urged ball check valve 38 is provided in an axial passage connecting inlet passage 32 with output passage 34 and another axial passage 40 provides communication between output passage 34 and counter bore 30. The purpose of check valve 38 and passage 40 will be more fully explained hereinafter.

A cylindrical bushing 42 is located in axial bore 28 and carries a rubber boot member 44 extending above the free end of housing section 22. Formed at axially spaced points in the outer wall of bushing 42 are a pair of annular grooves that cooperate with axial bore 28 to form annular chambers 43 and 45 adjacent passages 32 and 34, respectively. Cross ports 43a and 45a are formed in bushing 42 so that chambers 43 and 45 communicate with the interior of bushing 42. Extending downwardly from boot member 44 and into bushing 42 is a cup-shaped piston member 46 having a bore 48 in which is carried a compression spring 50. Piston member 46 terminates immediately above, as seen in the drawing, cross port 43a and is further formed with a counter bore 52 the inner periphery of which is in threaded engagement with the outer periphery of an annular extension 53 of a supply piston seat member 54. A frusto-conical projection 55 extends downwardly, as seen in the drawing, from piston seat member 54 and an axial through bore 58 extends through the piston seat member from a point immediately below, as seen in the drawing, cross port 43a to the end of the frusto conical projection. A conical supply valve seat 59 is formed at the upper end of through bore 58 and cross ports 58a are formed in the cylindrical extension so that through bore 58 can communicate with inlet passage 32 through cross ports 58a and 43a and also chamber 43. Communication across valve seat 59 can be cut off by a ball shaped supply valve member 60 which is urged toward the seat by spring 50 and which is of such a diameter as to be slideable in annular extension 53.

The interior of bushing 42 located below, as seen in the drawing, piston seat member 54 forms a chamber 57 which communicates with through bore 58 through its open lower end and also through cross ports 61 formed in frusto-conical projection 55. Chamber 57 communicates with output passage 34 through passage 45a and annular chamber 45. It can be seen, therefore, that when supply valve 60 is raised from its seat 59 and control valve 10 is open air can flow from reservoir 12 through pipe 13, inlet passage 32, annular chamber 43, cross port 43a, cross port 58a, across seat 59, through bore 58 and cross ports 61 into chamber 57 and then through cross port 45a, chamber 45, output passage 34 and pipe 15 to relay valve 16. When supply valve 60 seats on supply valve seat 59, of course, the air flow is cut off at the valve seat.

Slideably carried in and projecting from the lower end of bushing 42, as seen in the drawing, is an exhaust valve seat piston member 62 formed with a central bore 64 and a counter bore 66 having an exhaust valve seat 65 formed at the surface between the bore and the counter bore. One end of a coil spring 63 sits over frusto-conical projection 55 and bears on supply valve piston member 54 and the other end of the spring bears on the surface between bore 64 and counter bore 66 to urge exhaust valve seat piston member 62 downwardly through the bottom of bushing 42. A ball shaped exhaust valve member 68 normally bears on exhaust valve seat 65 and is connected to supply valve 60 by a pin 70 so that motion of one of the valve members is transmitted to the other.

As clearly seen in the drawing, most of the length of exhaust valve seat piston member 62 projects through the lower end of bushing 42, that is, all of the length though which counter bore 66 extends. A radial flange 67 projects around the periphery of piston member 62 adjacent exhaust valve seat 65 and bears on one side of a flexible diaphragm 72 through which the lower portion of piston member 62 projects. A retainer plate 69 bears on the opposite side of diaphragm 72 and is clamped thereto by a nut member 71 threadedly engaged with the outer surface of piston member 62. The outer periphery of diaphragm 72 is clamped between housing sections 22 and 24 so that counter bore 30 actually forms a control chamber. For reasons to be made clear hereinafter radial flange 67 functions as a stop member that limits upward movement of piston member 62 by eventually butting against the wall of counter bore or control chamber 30.

Housing portion 24 is provided with a central bore 74 having a diameter equal to that of control chamber 30. Bore 74 communicates with the atmosphere through an exhaust port 76 which may include a conventional filter or strainer device to keep dirt from the atmosphere from clogging the inside of the valve. It should be noted that exhaust port 76 communicates with output passage 34 when exhaust valve 68 is spaced from exhaust valve seat 65. Also formed in housing portion 24 is an axial passage 36a communicating with passage 36 and, consequently with air spring 20.

Housing portion 26 is provided with a pilot chamber 78 in the form of a cylindrical recess having an open end adjacent housing portion 24 and a closed end formed by a bottom wall of the housing. The diameter of pilot chamber 78 is less than the diameter of central bore 74 such that an annular shoulder or stop member 80 is formed between housing portions 24 and 26. Also, clamped between housing portions 24 and 26 is a sleeve-like guide member 82 formed with an inwardly projecting annular flange 84 at its free end. Slideably carried in guide member 82 is a control piston 86 having an upwardly extending sleeve portion 87 and a downwardly extending sleeve portion 89. Movement of piston 86 in guide member 82 is limited by shoulder 80 and flange 84 which cooperate with sleeve portions 89 and 87, respectively.

Pilot chamber 78 communicates with air spring 20 through a passage 36b which communicates with passages 36a and 36. Thus, variations in pressure in the air spring are communicated to pilot chamber 78 causing movement of piston 86 upwardly or downwardly in guide member 82 depending on whether the pressure is increasing or decreasing. A compression spring 88 bears on the upper face of piston 86 and also on retainer plate 69. At this point it will merely be noted that spring 88 functions as a motion transmitting mechanism, eventually resists upward movement of piston 86 and conversely, assists the downward movement of the piston. Another compression spring 90 bears on the bottom face of piston 86 and also on the bottom of pilot chamber 78 and provides a force upwardly on the piston to assist air spring pressure in moving the piston upwardly.

Having described the structure of a preferred embodiment of the invention, its operation will now be explained. As illustrated in the drawing, the brake system has been actuated and has just made a full brake application. However, for purposes of clarity in the explanation, assume that the brakes are not applied. Under the assumed conditions, control valve 10 is closed and there is no air flow from reservoir 12 to variable control valve 14. Assume also that the car body is empty and that a minimum supporting pressure is present in the air spring mechanism. The minimum pressure is also present in pilot chamber 78 and, along with spring 90, exerts a force acting upwardly on the bottom of piston 86. Balancing the upwardly acting forces is a force acting downwardly on the top of piston 86 which force is exerted by spring 88 which also exerts the same force on retainer plate 69. Since the opposing forces are balanced, the piston is at rest in a predetermined location in guide member 82; in the case of an empty car, with sleeve 89 bearing on shoulder 80. The force exerted on the retainer plate acts upwardly causing movement of exhaust valve seat piston member 62 until radial flange 67 bears on the housing wall of control chamber 30 adjacent bore 28 in housing portion 22. Upward movement of exhaust valve seat member 62 causes upward movement of exhaust valve 68 which, in turn, causes supply valve 60 to move upwardly via pin 70 from its seat 59. Thus, it can be seen that supply valve 60 is normally open and exhaust valve 68 is normally closed.

When a full brake application is to be made, control valve 10 is opened and air flows from reservoir 12, through pipe 13 to inlet passage 32 in variable control valve 14. Since supply valve 60 is open, the air continues flowing through passage 32, annular chamber 43, cross ports 43a and 58a, across valve seat 59 and through bore 58 and cross ports 61 into chamber 57. From chamber 57 the air flows through cross port 45a, chamber 45, output passage 34 and pipe 15 to relay valve 16. As noted previously relay valve 16 is controlled by the air pressure in pipe 15 and controls the flow of air to brake cylinder 18. At the same time, air in output passage 34 also flows through passage 40 into control chamber 30 so that the pressure in the output passage and at the relay valve is also present in the control chamber. When the pressure in control chamber 30 reaches a predetermined level sufficient to overcome the force exerted on retainer plate 69 by spring 88, diaphragm 72 moves downwardly and carries exhaust valve seat piston member with it. Spring 88 compresses as the diaphragm moves downwardly since one end bears on piston 86 which bears on shoulder 80. Spring 50 acting down on supply valve 60 causes it and also exhaust valve 68 to move downwardly until the supply valve bears on supply valve seat 59. At this point, air no longer flows across valve seat 59 and no more pressure is delivered to outlet passage 34 or relay valve 16. The pressure in relay valve 16 is sufficient to allow enough air to flow from reservoir 12 to brake cylinder 18 so that the braking force applied to the wheels equals that required for a full brake application of an empty car.

It should be noted that if only partial braking is desired, control valve 10 allows only a reduced air pressure to be delivered through variable control valve 14 which, therefore, exercises no control over the air. Thus, variable load control valve 14 is operative only during a full brake application, either full service or emergency depending on the type of system.

It should also be noted that as the load on the car body increases and the pressure in air spring 20 and pilot chamber 78 increases, the piston moves upwardly causing spring 88 and diaphragm 72 to move upwardly until flange 67 bears on the wall of control chamber 30. Thereafter spring 88 is compressed until it exerts a force sufficient to balance the forces urging the spring upwardly. At this point movement of the piston stops. The force now exerted by spring 88 on both piston 86 and retainer plate 69 has increased, of course, and higher pressure in control chamber 30 is now required to move diaphragm 72 downwardly to close supply valve 60 during a full brake application. This means that higher pressure can be delivered to output passage 34 and relay valve 16. One difference should be noted between the operation of the variable load control valve when the car is empty and when the car has a load. When the car is empty, lower sleeve 89 bears on shoulder 80 so that movement of diaphragm 72 is always resisted by spring 88. When the car is loaded, however, sleeve 89 is spaced from shoulder 80 and movement of diaphragm 72 initially causes spring 88 to move downwardly a slight distance until a new balanced position of piston 86 is reached and the spring against resists movement of the diaphragm.

While the brakes are applied and supply valve 60 is seated on valve seat 59, it is possible for leakage to occur across the valve seat due to dirt clogged between the valve and the seat or for any of a number of other reasons. After the passage of sufficient time, of course, this leakage causes a pressure build-up in chamber 63, output passage 34, relay valve 16 and also control chamber 30. After a slight such pressure build-up, the increased pressure in control chamber 30 causes diaphragm 72 to move downwardly. Since, however, supply valve 60 is bearing on seat 59, it cannot move downwardly and since pin 70 connects the supply valve with exhaust valve 68, the latter cannot move downwardly. Downward movement of diaphragm 72 causes corresponding movement of exhaust valve seat piston member 62 and thus exhaust valve 68 is spaced from seat 65. Therefore, air in relay valve 16, passage 34, chamber 63 and control chamber 30 flows across seat 65 through counter bore 66 into bore 74 and through exhaust valve opening 76 to the atmosphere. As the air is exhausted the pressure in control chamber 30 decreases so that spring 88 forces diaphragm upwardly until exhaust valve seat 65 bears against exhaust valve 68. Thus, the full pressure is maintained in relay valve 16.

When it is desired to release the brakes, control valve 10 is closed and air in inlet passage 32 and conduit 13 is exhausted through control valve 10 to the atmosphere. When the pressure in inlet passage 32 decreases sufficiently, the higher pressure in output passage 34 causes check valve 38 to open so that air flows from relay valve 16 through pipe 15 and passage 34 to inlet passage 32, back through pipe 13 and to the atmosphere through control valve 10. It should be apparent that air is also exhausted from control chamber 30 so that spring 88 causes diaphragm 72 to move upwardly until flange 67 bears on the wall adjacent bore 28 whereupon supply valve 60 is spaced from seat 59.

As noted previously, the forces exerted on each side of piston 86 will eventually always balance and cause the piston to assume a predetermined position in guide member 82. It will be remembered that when the pressure in air spring 20 is set to support an empty car body, the predetermined position of piston 86 is such that lower sleeve 89 bears on shoulder 80. If the air spring ruptures and its pressure drops to zero or if for any other reason air spring pressure drops below that required to support an empty car, the pressure in pilot chamber 78 drops accordingly, but piston 86 cannot fall below the predetermined location set by shoulder 80. Supply valve 60 will thus remain open and the brake system will always provide at least full braking for an empty car. As also noted previously, upward movement of piston 86 is limited by upper sleeve 87 and radial flange 84. The location of flange 84 is predetermined to stop upward movement of piston 86 at the position the piston would assume when the car body is fully loaded or, preferably, slightly above that position. If flange 84 is located slightly above the full load position of piston 86, pressure in relay valve 16 can exceed full brake pressure to provide a margin of safety for the system without causing the wheels to slide. Thus, if the air spring mechanism malfunctions and excessive pressure is provided in pilot chamber 78, movement of piston 86 will stop when upper sleeve 87 bears on flange 84. Accordingly, spring 88 only exerts, under this condition, a force against retainer plate 69 which is only slightly higher than that exerted when the car is fully loaded and the force exerted by spring 88 which must be overcome by the pressure in control chamber 30 to close supply valve 60 will never exceed a predetermined, safe limit. Otherwise, excessive pressure could be supplied to brake cylinder 18 causing the application of excessive braking forces to the wheels of the car and finally a broken linkage between the cylinder and the brake shoes. The latter would, of course, result in a loss of brakes on the car.

Finally, it should be noted that the location of shoulder 80 and flange 84 can be adjusted by using shims or leveling screws. Thus, the pressures provided in relay valve 16 can also be adjusted.

Another important aspect of this invention resides in the relationship between the spring constants of springs 88 and 90. It should be clear that pressure in air spring 20 varies according to a first relationship reflecting the fact that the load change sensed by the air spring mechanism is with respect to the weight of the car body only. It should also be clear that pressure delivered to relay valve 16 varies according to a second and different relationship reflecting the fact that the change in full brake application pressure in relay valve 16 is with respect to the weight of the car body plus the weight of the trucks. Accordingly, the full braking pressure need not vary as greatly as the air spring pressure. The difference in the first and second relationships is especially significant in modern, rapid transit cars where the car body is of lightweight construction, but adapted to carry relatively high load. For example, referring to FIG. 2, there are illustrated an air spring pressure curve and a relay valve pressure curve for a new rapid transit car. Curve A is linear and illustrates the pressure variation in the air spring mechanism between an empty and a fully loaded car. Curve B is also linear and illustrates the pressure variation in the full brake pressure which can be provided in the relay valve between an empty car and a fully loaded car. It can be seen that the slope or rate of pressure change with respect to rail load is larger for the air spring mechanism than for the relay valve. Prior to the advent of these lightweight rapid transit cars the difference in the slope of the curves has generally been ignored since it has not been very significant. According to this invention, however, the pressure in both the air spring mechanism and the relay valve will vary according to their required relationships.

In accordance with this invention, the effective areas, that is, the areas over which air pressures act, of piston 86 and diaphragm 72 are equal. The spring constant of spring 88, however, is larger than that of spring 90 by an amount which causes full service brake pressure to vary according to its required relationship even though air spring pressure varies according to its required relationship.

To clearly understand how the spring relationship operates, consider the forces acting on piston 86 prior to movement of piston 86 upwardly, as seen in FIG. 1, in response to an increase in air spring pressure. Acting upwardly is a force exerted by spring 90 and a force caused by air spring pressure multiplied by the effective area of the piston. Acting downwardly and equal to the forces acting upwardly is the force exerted by spring 88. When air spring pressure increases in response to an increased load on the car body, the force exerted by spring 90 decreases since it is moving toward its relaxed position. Thus, some of the increased air spring pressure is dissipated in making up for the loss in force exerted by spring 90. At the same time, the force exerted by spring 88 is increasing and since it has a higher spring constant, the force it exerts increases at a faster rate than the decreasing force exerted by spring 90. Eventually, piston 86 comes to rest.

To close supply valve 60, as has already been explained, it is necessary to exert an air pressure in control chamber 30 which causes spring 88 to compress. That is, a force must be exerted that is greater than the combined forces acting upwardly on piston 86. It should be clear that all of the increased air spring pressure has not been transmitted to spring 88 since some of the force must offset the loss in force exerted by spring 90. Accordingly, the force created by pressure in control chamber 30 to compress spring 88 need not have increased as greatly as the air spring pressure increased.

For example, one design for a rapid transit car currently under construction and incorporating a braking system in accordance with this invention has a car body weighing approximately 49,000 lbs. and trucks weighing approximately 35,000 lbs. For an empty car, the rail load is approximately 84,000 lbs., that is, the sum of the weight of the car body plus the weight of the trucks. The car body utilizes high strength, low weight materials and can safely carry a load of up to 49,000 lbs.

Accordingly, air spring 20 supports 49,000 lbs. when the car is empty and 98,000 lbs. when the car is full. Referring to FIG. 2 of the drawing, it can be seen that air spring pressure varies from 35 psi to 74 psi, a change of more than 100 percent. However, the change in rail load is not as significant, since it varies from 84,000 for an empty car to 133,000 lbs. for a full car and, again referring to FIG. 2, pressure in relay valve 16 varies from 58 psi to 83 psi. To accomplish this result for cars according to the above example, spring 88 should have a spring constant slightly in excess of three times that of spring 90. With this relationship, full brake pressure will vary according to its desired relationship while the air spring pressure will vary according to its different and desired relationship.

While in the foregoing there has been described a preferred embodiment of the invention, various modifications may become apparent to those skilled in the art to which this invention relates. Accordingly, all such modifications are included within the intended scope of the invention as recited in the following claims.

What is claimed is:

1. Variable load fluid brake control apparatus for an air spring vehicle developing a variable fluid pressure in accordance with variations in the vehicle load, having a supply valve governing supply of fluid pressure to the brakes and load control means for governing operation of the supply valve wherein the improvement comprises;

a. a control piston for axially operating the supply valve having a control pressure chamber on one side of the piston and a load compensating chamber on the other side of the piston,
   b. compensating means for governing operation of the supply valve comprising;
      1. compensating piston axially spaced from the control piston by a first compression spring disposed between one side of the compensating piston and said other side of the control piston,
      2. a second compression spring co-axial with the compensating piston disposed between a fixed support and the other side of the compensating piston and 3. a fluid chamber at said other side of the compensating piston adapted to receive variable fluid pressure from the air springs for acting upon the compensating piston.

2. Variable load fluid brake control apparatus according to claim 1 wherein the spring constant of the first spring is higher than the spring constant of the second spring.

3. Variable load fluid brake control apparatus according to claim 2 wherein the spring constant of the first spring is substantially three times the spring constant of the second spring.

4. Variable load fluid brake control apparatus according to claim 1 wherein limiting means is provided for the compensating piston to limit its axial movement to a desired range of compensation for vehicle load, irrespective of failure of the air spring to develop a desired variable fluid pressure.

5. Variable load fluid brake control apparatus according to claim 4 wherein the limiting means includes stops associated with opposite ends of a sleeve containing the compensating piston.

6. Variable load fluid brake control apparatus according to claim 1 wherein the compensating piston is oppositely biased axially by the two springs.

7. Variable load fluid brake control apparatus according to claim 6 wherein the spring constant of the first spring is materially higher than the spring constant of the second spring.

* * * * *